United States Patent
Kim et al.

(10) Patent No.: US 7,032,157 B2
(45) Date of Patent: Apr. 18, 2006

(54) METHOD FOR OPTIMIZING UDMA TRANSFER SIGNALS USING CRC ERRORS

(75) Inventors: Gyu-Taek Kim, Santa Clara, CA (US);
Young Dug Jung, San Jose, CA (US);
Yeong Kyun Lee, San Jose, CA (US);
Chin Won Cho, San Jose, CA (US)

(73) Assignee: Samsung Electronics, Co., Ltd., Suwon (KR)

( * ) Notice: Subject to any disclaimer, the term of this patent is extended or adjusted under 35 U.S.C. 154(b) by 546 days.

(21) Appl. No.: 10/390,317

(22) Filed: Mar. 17, 2003

(65) Prior Publication Data

US 2004/0187067 A1 Sep. 23, 2004

(51) Int. Cl.
*H03M 13/00* (2006.01)

(52) U.S. Cl. .......................... 714/758; 360/31
(58) Field of Classification Search ............... 714/758; 360/31

See application file for complete search history.

(56) References Cited

U.S. PATENT DOCUMENTS 6,275,346 B1* 8/2001 Kim et al. ................. 360/31

OTHER PUBLICATIONS

Schurgers et al. "Adaptive turbo decoding for indoor wireless communication; 1998 URSI International Symposium on Signals, Systems, and Electronics, ISSSE 98, pp: 107-111; Oct. 2, 1998."*

Chida et al. Magnetooptical memory experiments on a rotating Mn-Cu-Bi disk medium; IEEE Transactions on Magnetics; Publication Date: May 1977, vol.: 13, Issue: 3, On page(s): 982-988; Posted online: Jan. 6, 2003 16:54:43. 0.*

* cited by examiner

*Primary Examiner*—Guy J. Lamarre
(74) *Attorney, Agent, or Firm*—Jeffrey P. Aiello

(57) ABSTRACT

A method for optimizing UDMA transfer signals parameter that functions independently of a computer system is provided. The method of the invention utilizes UDMA CRC errors to adjust an optimized UDMA transfer signal parameter. A total error rate is logged for each selected parameter for determining the parameter with the lowest total error rate. The method functions continuously, to provide reduced CRC error generation and data corruption, and enhanced UDMA transfer signal integrity.

7 Claims, 2 Drawing Sheets

METHOD FOR OPTIMIZING UDMA TRANSFER SIGNALS USING CRC ERRORS

BACKGROUND OF THE INVENTION

1. Field of the Invention

The present invention relates generally to data transfer methods and apparatus and, more particularly, to a method and apparatus for optimizing UDMA data transfer by utilizing UDMA CRC error.

2. Background Information

The speed that data is transferred between a data storage device, such as a hard disk drive, and a computer is critical to the performance of computer systems, such as personal computers. As the processing and memory speeds of the computer increase, improving data transfer rates between the storage device and computer are critical to improving the performance of the computer system.

The computer typically includes a system board, commonly referred to as a motherboard, which includes a CPU, memory, and a support chipset, that includes hardware and software. One well known interface for coupling a hard disk drive to a computer is an Integrated Drive Electronics (IDE)/AT Attachment (ATA) interface. Essentially, an IDE/ATA interface is a standard way for a storage device to connect to a computer, through the use of programmed I/O. In programmed I/O (PIO) the CPU and support hardware directly control the transfer of data between the motherboard and the storage device.

Using PIO, the CPU is responsible for executing the instructions that transfer the data to and from the drive, using special I/O locations. A disadvantage of this technique is that each time a data read or write is needed the CPU is used. This can slow the execution of other operations that the CPU is performing. Thus, the use of PIO modes has become a hindrance to the performance of recently developed hard disk drives.

Direct memory access (DMA) modes were developed to improve upon the performance restrictions of PIO. For example, multiword DMA mode 2, has a maximum data transfer rate of about 16.7 B/s. However, as hard disk drives become faster and faster, DMA is becoming insufficient.

In an effort to overcome the disadvantages of DMA, Ultra DMA (UDMA) modes were developed. With UDMA, data is transferred on both the rising and falling edges of the clock. This is known as double transition clocking. Double transition clocking allows for data throughput of the interface to be doubled for any given clock speed.

Due to the significant data transfer speeds of UDMA, integrity of the UDMA transfer signal becomes problematic. Signal integrity problems may result in data errors. In order to improve the integrity of the UDMA interface, UDMA also introduced the use of cyclical redundancy checking, or CRC, on the interface. With UDMA, a device sending data uses a CRC algorithm to calculate redundant information from each block of data sent over the interface. This CRC information, known as "CRC code" is sent along with the data. On the other end of the interface, a recipient of the data does the same CRC calculation and compares its result to the CRC code delivered by the sender.

A mismatch indicates that data was corrupted and the block of data may need to be resent. A selected number of attempts may be made to resend the corrupted data until error-less data is received by the recipient, depending upon the operating system of the computer system. If errors occur frequently, the computer may determine that there are hardware problems and drop to a slower UDMA mode, or may disable UDMA operation.

A support chipset may be configured to modify the UDMA transfer signal, for generating a signal with an efficient shape for UDMA transfer. This is performed by first measuring the signal. The signal measurements are used to calculate desired parameters that affect the shape of the UDMA transfer related signal. The values of hardware components of the support chipset, such as resistors and capacitors, can be selected or adjusted until the desired shape of the UDMA signal is obtained and the UDMA transfer signal is optimized. The values of these components comprise the desired parameters. Additionally, emerging technologies, such as HDC (Hard Disk Controller) chips have the ability to control slew (slope) of the UDMA signal, as well as setup and holding time.

A disadvantage to this technique is that the parameter that is used for optimizing the UDMA transfer signal can be different for each computer system. Each data storage device and data bus may have different characteristics. This may necessitate the calculation of a different parameter for each computer system. Additionally, coupling a different data storage device to the same computer via the same data bus may generate a different parameter, since the characteristics of the replacement data storage device may be different from the initial data storage device.

Accordingly, there exists a need for a method of optimizing a UDMA transfer signal parameter that functions independently of the computer system.

BRIEF SUMMARY OF THE INVENTION

The present invention provides a method for optimizing a UDMA transfer signal parameter that functions independently of a computer system. The method of the invention utilizes UDMA CRC errors to adjust an optimized UDMA transfer signal parameter.

In a preferred embodiment of the invented method, a default parameter for optimizing UDMA transfer signals is selected. A default parameter may be provided for each UDMA transfer signal mode.

Data is transferred between a data storage device and a computer, via a data bus. Cyclical redundancy checking (CRC) is used to check for corrupted data. A CRC error is generated when corrupted data is detected.

A total error rate is calculated for the selected parameter. The total error rate is calculated by dividing CRC errors by host transfer rate. As CRC errors are generated, a log is created for determining the total error rate of the selected parameter. This process is repeated for each default parameter.

Upon obtaining the total error rate for each default parameter, the default parameter with the lowest error rate is selected. This default parameter then becomes an operating default parameter.

Once a predetermined number of CRC errors are generated over a period of time using the operating default parameter, the invented method again determines of the total error rate for the operating default parameter. A new total error rate for each default parameter may be generated. Upon obtaining the total error rate for each default parameter, the parameter with the lowest total error rate is selected as the new operating default parameter. The method is continuously active to provide reduced CRC error generation and data corruption.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes presently contemplated by the inventors of carrying out the invention. Various modifications, however, will remain readily apparent to those skilled in the art, since the generic principles of the present invention have been defined herein.

The present invention provides a method for optimizing a UDMA transfer signal parameter. The invented method functions independently of a computer system. The method of the invention utilizes UDMA CRC errors to adjust an optimized UDMA transfer signal parameter. The method is continuously active to provide reduced CRC error generation and data corruption.

Figure 1:
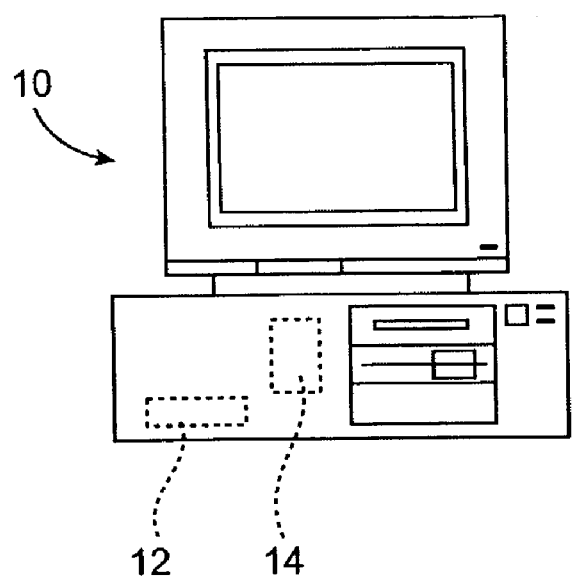
FIG. 1 and FIG. 2 are schematic diagrams of a computer system embodying the present invention.
Figure 2:
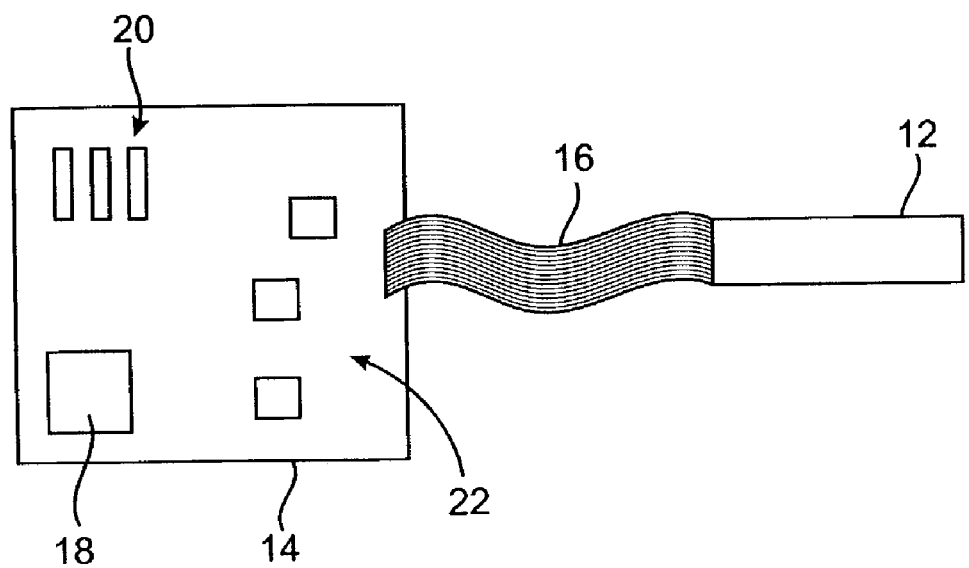

Referring to FIG. 1 and FIG. 2 of the drawings, a preferred embodiment of the method of the present invention may be active in a computer system, such as a personal computer system, shown generally at 10. The method may be uploaded to a data storage device 12 of the computer system 10, using known means. For example, the invented method may be provided in the form of a computer program and uploaded onto the computer system 10 and stored on the storage device 12, as is well known.

The computer system 10 may embody the data storage device 12. The data storage device 12 may comprise a hard disk drive or optical drive, for example. The data storage device 12 is coupled to a computer 14 of the computer system 10 via a data bus 16. The computer 14, often referred to in the art as a "motherboard", includes a CPU 18, memory 20, and support hardware, shown generally at 22. The support hardware 22 is commonly referred to as a "chipset" in the art. The CPU 18, memory 20, and support hardware 22 are interconnected via known circuitry, as is well known.

In use, the computer 14 reads data stored on the storage device 12 and writes data to the storage device 12. Data is transferred to and from the storage device 12 via the data bus 16. The speed with which data is read from, or written to, the storage device 12, and transferred via the data bus 16, is critical to the performance of the computer system 10.

Data may be transferred between the data storage device 12 and computer 14 using Ultra DMA (UDMA) data transfer modes for optimal data transfer rates. The components of the support hardware 22 may be adjusted to modify the shape of the UDMA transfer signals, for generating a signal with an efficient shape for UDMA data transfer. This is performed by first measuring the UDMA transfer signals. The signal measurements are used to calculate a number of default parameters that affect the shape of the UDMA transfer signal. A default parameter providing an optimized signal shape is selected for each UDMA transfer signal mode. There may be different default parameters, depending upon the UDMA transfer signal mode selected.

Even with optimized UDMA transfer signals, data may still be corrupted. Cyclical redundancy checking (CRC) is used to check for this corrupted data. A CRC error is generated when corrupted data is detected.

Figure 3:
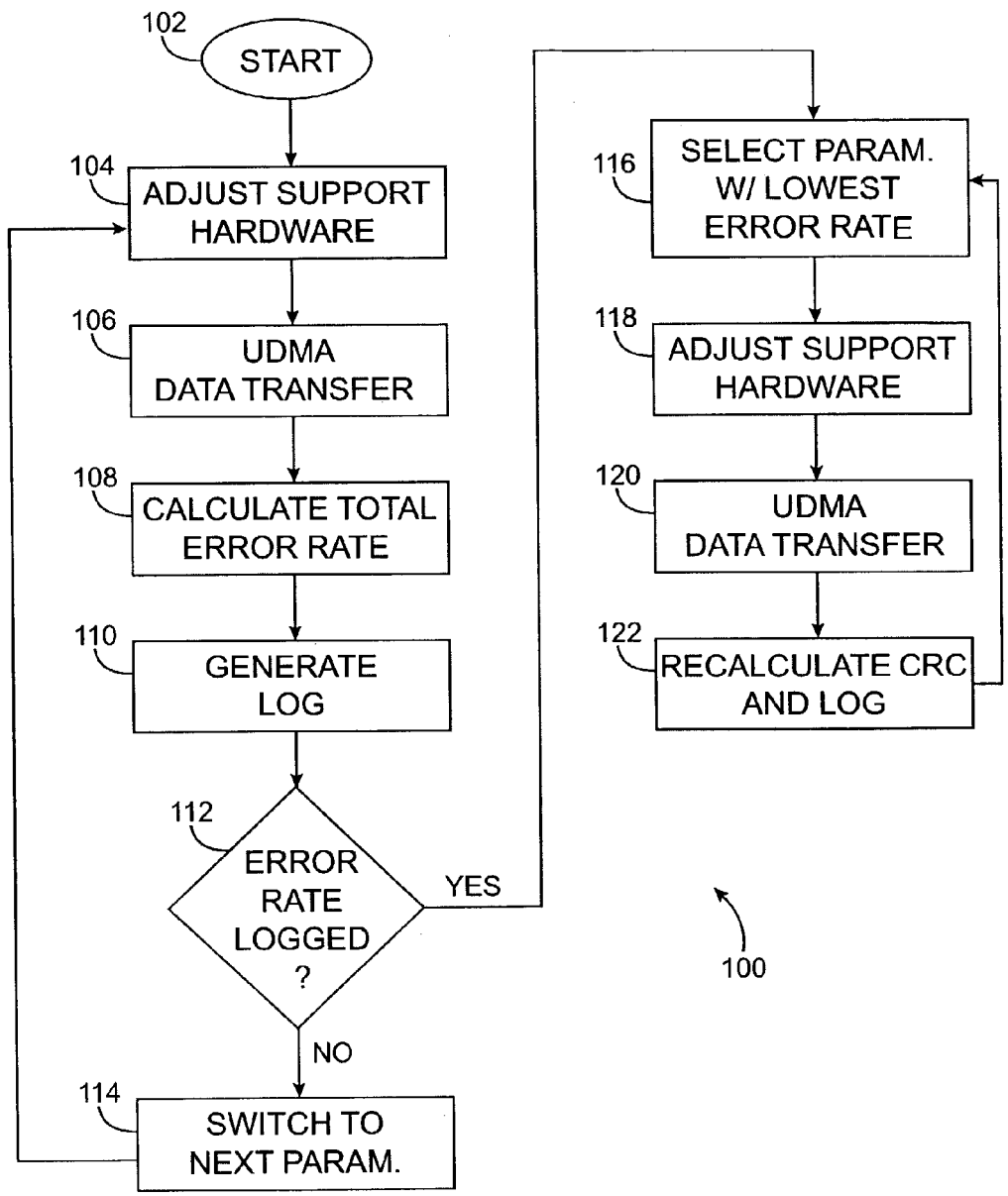
FIG. 3 is a flow chart showing a preferred embodiment of the method of the present invention.

Referring now to FIG. 3 of the drawings, the method of the present invention is shown generally at 100. The method 100 commences in start block 102. In process block 104, the components of the support hardware 22 are adjusted to provide an optimal shape of the UDMA transfer signal in a first selected mode, for generating a first default parameter. The components of the support hardware 22 may be adjusted for each UDMA transfer signal mode. This may result in a several different default parameters and different default parameters for each UDMA transfer signal mode.

In process block 106, data is transferred, in a selected UDMA signal transfer mode, between the data storage device 12 and computer 14. Cyclical redundancy checking (CRC) is used to check for corrupted data, as the data is transferred.

In process block 108, a total error rate is calculated for the first default parameter. The total error rate is calculated by dividing CRC errors by host transfer rate. Host transfer rate is the data bit transfer rate between the computer 14 and data storage device 12. In process block 110, a log is created for determining the total error rate of the first default parameter. The method 100 then continues to decision block 112.

In decision block 112 it is determined if a log of the total error rate for each default parameter has been generated. If a log of the total error rate for each default parameter has not been generated, the method 100 continues to process block 114. If the total error rate has been calculated, the method 100 continues to process block 116.

If it is determined, in decision block 112, that the total error rate for each default parameter has not been generated, then in process block 114 the method 100 adjusts the default parameter to a next default parameter. The method 100 then returns to process block 104, where the support hardware 22 is again adjusted. The method 100 then continues as previously discussed. This process continues until a log for the total error rate of each default parameter is generated. This process may be repeated for each UDMA transfer signal mode.

If it is determined in decision block 112 that a log of the total error rate for each default parameter was generated, then the method 100 continues to process block 116. In process block 116 the default parameter with the lowest error rate is selected. This default parameter then becomes an operating parameter. The support hardware 22 is adjusted as the selected parameter in process block 118.

The operating parameter is constantly monitored by the invented method 100 for generation of CRC errors. In process block 120, data is transferred, via the selected UDMA signal transfer mode, using the operating parameter. CRC is used to check for corrupted data, as the data is transferred.

In process block 122, total error rate of the operating parameter is recalculated and logged. The method 100 then returns to process block 116 where the default parameter with the lowest total error rate is selected. This selected default parameter becomes the new operating parameter. The method 100 then continues to as discussed.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for optimizing a transfer signal parameter, the method comprising the following steps:
   (a) selecting a parameter;
   (b) transferring data between a storage device and a computer using the selected parameter;
   (c) performing error checking to check for corrupted data;
   (d) generating errors when corrupted data is detected;
   (e) calculating a total error rate for the parameter;
   (f) generating a log of the total error rate;
   (g) selecting a second parameter;
   (h) repeating steps b through f for generating a log of the total error rate for the second parameter;
   (i) selecting the parameter having a lowest total error rate; and
   (j) transferring data between the storage device and computer using the selected parameter.

2. The method of claim 1 further comprising the following steps:
   (k) repeating steps a though i upon detection of the generation of errors.

3. A method for optimizing a UDMA transfer signal parameter, the method comprising the following steps:
   (a) selecting a default parameter;
   (b) transferring data between a storage device and a computer using the selected parameter;
   (c) performing cyclical redundancy checking to check for corrupted data;
   (d) generating cyclical redundancy errors when corrupted data is detected;
   (e) calculating a total error rate for the default parameter;
   (f) generating a log of the total error rate for the default parameter;
   (g) selecting a second default parameter;
   (h) repeating steps b through f for generating a log of the total error rate for the second default parameter;
   (i) selecting one of the default parameter and the second default parameter having a lowest total error rate; and
   (j) transferring data via UDMA transfer signals between the storage device and computer using the selected default parameter.

4. The method of claim 3 further comprising the following steps:
   (k) repeating steps a though i upon detection of the generation of errors.

5. A method for optimizing a UDMA transfer signal parameter, the method comprising the following steps:
   (a) providing at least one default parameter;
   (b) selecting one of the default parameters;
   (c) transferring data between a storage device and a computer using the selected default parameter;
   (d) performing cyclical redundancy checking to check for corrupted data;
   (e) generating cyclical redundancy errors when corrupted data is detected;
   (f) calculating a total error rate for the selected default parameter;
   (g) generating a log of the total error rate for the selected default parameter;
   (h) selecting a second default parameter;
   (i) repeating steps c through g for generating a log of the total error rate for the second default parameter;
   (j) repeating steps b through g for generating a log of the total error rate for each provided default parameter;
   (k) selecting the default parameter having a lowest total error rate; and
   (l) transferring data via UDMA transfer signals between the storage device and computer using the selected default parameter.

6. The method of claim 5 further comprising the following steps:
   (m) monitoring data transfer between the storage device and computer using the selected default parameter;
   (n) calculating the total error rate for the selected default parameter;
   (o) comparing the total error rate of the selected default parameter to the total error of each default parameter; and
   (r) selecting the default parameter having a lowest total error rate.

7. The method of claim 6 wherein the method is continuously active.

* * * * *